United States Patent [19]

McCabe

[11] Patent Number: 5,068,117

[45] Date of Patent: * Nov. 26, 1991

[54] METHOD OF PRODUCING SIMULATED MEAT PRODUCT FROM WHOLE SOYBEANS

[75] Inventor: Edward M. McCabe, Marysville, Ohio

[73] Assignee: Nestec S.A., Vevey, Switzerland

[ * ] Notice: The portion of the term of this patent subsequent to Jul. 24, 2007 has been disclaimed.

[21] Appl. No.: 556,139

[22] Filed: Jul. 23, 1990

Related U.S. Application Data

[63] Continuation-in-part of Ser. No. 318,793, Mar. 3, 1989, Pat. No. 4,943,441.

[51] Int. Cl.$^5$ .............................................. A23J 3/22
[52] U.S. Cl. .................................... 426/511; 426/448; 426/516; 426/634; 426/802
[58] Field of Search ............... 426/634, 331, 448, 511, 426/516, 802

[56] References Cited

U.S. PATENT DOCUMENTS

| | | | |
|---|---|---|---|
| 3,488,770 | 1/1970 | Atkinson | 426/104 |
| 3,865,802 | 2/1975 | Mustakas | 260/123.5 |
| 4,038,432 | 7/1978 | Hildebolt et al. | 426/511 |
| 4,247,566 | 1/1981 | Inagami et al. | 426/276 |
| 4,369,195 | 1/1983 | Nelson et al. | 426/62 |
| 4,744,524 | 5/1988 | Gupta et al. | 241/36 |
| 4,943,441 | 7/1990 | McCabe | 426/511 |

Primary Examiner—Donald E. Czaja
Assistant Examiner—John Mowbray

[57] ABSTRACT

A method of processing whole soybeans to produce discrete, irregularly-shaped chunks or pieces of textured proteinaceous material which are free from off-flavors and odors and have a meat-like texture and appearance. Whole soybeans are hydrated and acidified to a pH in the range of about 4.5 to 6.5 and the pH of the soybeans is maintained in this range throughout processing. The acidified whole soybeans are ground in an aqueous medium to provide an aqueous slurry or dough of soybean particles having a pH in the range of 4.5-6.5. The aqueous acidic slurry or dough is passed through a confined treatment zone in which high temperature pressurized steam is injected directly into a confined stream of the slurry or dough under conditions which effect texturization of the soy protein in the form of discrete chunks or pieces which are discharged from the treatment zone. The texturized pieces, when discharged from the treatment zone or when dried and rehydrated are free of off-flavors and odors and have a meat-like texture, firmness and appearance. They are suitable for use in a wide variety of food products, including frozen products, canned products and dry mix products. If desired, additives such as flavoring, coloring, fat, seasoning and other proteinaceous materials, including soy protein isolate, may be incorporated in the texturized soy protein pieces to modify the texture of the texturized pieces.

12 Claims, No Drawings

METHOD OF PRODUCING SIMULATED MEAT PRODUCT FROM WHOLE SOYBEANS

This application is a continuation-in-part of application Ser. No. 07/318,793, filed Mar. 3, 1989, now U.S. Pat. No. 4,943,441.

BACKGROUND OF THE INVENTION

This invention relates to the production of simulated meat products from whole soybeans. More particularly, the invention relates to a method of processing whole soybeans to produce textured soy protein products which are free from off-flavors and odors and have a meat-like firmness, texture and appearance.

Considerable effort has been directed by the food industry in recent years toward the production of simulated meat products from vegetable protein materials, particularly soybeans. It is well known that whole soybeans are an excellent source of nutrition. Whole soybeans contain approximately 40% (dry basis) protein of very good quality, and about 20% fat, with the fat being unsaturated. However, whole soybeans have not been widely accepted as a nutritional source in foods for human consumption in many countries. This lack of acceptance is due in large part to the fact that products made from whole soybeans typically have an objectionable flavor and odor characterized as "grassy" or "beany," and that simulated meat products made heretofore from soybean material lack the textural qualities typically associated with meat products.

A variety of procedures have been developed for producing simulated meat products from soy protein materials such as soybean meal, defatted soybean meal, and soy protein isolates and concentrates. Such prior procedures typically produce simulated meat products by methods which involve either the manufacture of protein fibers or the thermoplastic extrusion of soy protein materials. In the manufacture of simulated meat products by protein fiber production, individual filaments or fibers are formed from the soy material, and the fibers are assembled into bundles to which binding agents, coloring and flavor are added and the fiber bundles are shaped to resemble familiar meat products. Procedures for producing such soy protein fibers are disclosed in U.S. Pat. Nos. 2,682,466 to Boyer; 3,482,998 to Carroll et al; and 3,911,159 to Heusdens. The thermoplastic extrusion method of forming simulated meat products from soy protein materials involves subjecting a mixture of soy protein material and water to heat and pressure in an extruder cooker to form a thermoplastic mass, and extruding the mass through a restricted die orifice into an area of reduced pressure to cause the extruded filament to expand and form a fibrous cellular structure. Extrusion procedures for producing protein meat analogs are disclosed in U.S Pat. Nos. 3,488,770 to Atkinson; and 3,496,858 to Jenkins.

These prior procedures suffer from a number of disadvantages which have restricted their widespread acceptability. For example, the amount of texturization is generally proportional to the protein content of the proteinaceous starting material, making it necessary to use soy concentrates and isolates rather than less expensive soy protein materials. Also, such prior processes generally have employed such complex apparatus and procedures that equipment and operating costs have made the textured protein products economically unattractive. In addition, prior procedures have not been entirely successful in masking or eliminating the undesirable bean-like or grassy flavors and odors which are characteristic of soybean materials. As a result, the simulated meat products produced by such prior procedures are of marginal palatability and require the careful control of flavorants to minimize this problem. A variety of procedures have been proposed for the removal of such off-flavors and odors from soy protein products. For example, U.S. Pat. No. 3,142,571 discloses extracting expanded soy protein products with hot water to leach out the undesirable flavors. U.S. Pat. No. 3,642,490 discloses subjecting an aqueous slurry of soy protein isolate to dynamic instantaneous heating while the slurry is dynamically physically worked under positive pressure and then releasing the pressure to cause flash off volatilization of the components causing off-flavors and odors. The resulting slurry is said to have a bland flavor. These prior procedures, which are directed to the removal of off-flavor and odor components from the soy protein material, are only marginally effective in producing soy protein products which are truly free of the objectionable "beany" and "grassy" flavors and odors.

Such objectionable flavors and odors in products produced from soy protein materials result from peroxide reactions associated with polyunsaturated fatty acids in the soybean and is initiated by lipoxygenase enzymes which have an optimum activity at a pH in the range of about 7.0 to 9.0. These reactions occur almost instantaneously when the cell tissue of soybean cotyledons is disrupted in any way in the presence of even a small amount of moisture, and once these off-flavor components have been formed, they are virtually impossible to remove. Prior attempts to reduce this problem by inactivating the lipoxidase enzymes by heat treatment of soybeans has not been successful in preventing the occurrence of such off-flavors.

SUMMARY OF THE INVENTION

The present invention provides a method of processing whole soybeans to form discrete chunks or pieces of textured soy protein material, free of the undesirable beany or grassy flavor and odor characteristics typically associated with soybean products, with the texturized soy pieces having a meat-like firmness, texture and appearance. In the method of the present invention, soybeans, either whole beans or cracked and dehulled beans, are hydrated and acidified to a pH sufficient to inhibit lipoxidase enzyme activity, typically to a pH in the range of between about 4.5 to 6.5, and the acidified soybeans are then ground in an aqueous medium to provide an aqueous dispersion of ground soybean particles in the form of an aqueous slurry or dough, with the slurry or dough having a pH in the range of between about 4.5 to 6.5. The acidic slurry or dough thus formed is pumped through a confined treatment zone in which pressurized steam, at a pressure of at least about 10 psig, is injected directly into a confined stream of the slurry or dough of the soybean particles as it passes through the treatment zone. This direct contact of high temperature steam with the dispersion of soybean particles effects a large input of energy into the soy protein and alters the tertiary structure of the protein. This alteration of the protein structure causes almost instantaneous denaturation with the texturization of the protein in the form of distinct particles. The texturized protein is discharged from the treatment zone as irregularly shaped, discrete, chunks or pieces which are free of off-flavors and odors and have a taste which is surprisingly mild and bland. The textured protein chunks thus produced have a composition which reflects the composition of whole soybeans, namely about 40-45% protein, 18-22% fat, 30-35% carbohydrate and ash, and provide an excellent source of nutrition.

The firmness texture and appearance of the texturized particles may be varied by varying the solids content and pH of the particulate soybean dispersion to be texturized. Thus, at a given pH, an increase in the soy solids level of the aqueous dispersion will result in an increase in the firmness of the texturized pieces. Also, the textural value or firmness of the texturized soy pieces as produced is dependent on the pH of the particulate soybean dispersion, with the highest textural values occurring over a pH range of about 4.6 to 5.4. In this range the texturized pieces have a texture, firmness and appearance similar to cooked ground beef. As the pH of the soy dispersion is increased above about 5.4, there is a loss of firmness and particle integrity of the texturized pieces as produced, making the pieces textured at such pH levels unsuitable, as produced, for use as meat substitutes. However, when such pieces are dried and then rehydrated, the rehydrated pieces have a meat-like firmness, enabling the rehydrated pieces to be used as meat substitutes. All of the textured pieces produced over the pH range of 4.5 to 6.5 are free from objectionable flavor and odors typically associated with soybean products.

It has also been found that the textural value or firmness of the texturized soy protein pieces produced by the process described above may be significantly increased by drying and rehydrating the texturized pieces. That is, when the texturized pieces produced by the steam texturizing step are dried to a moisture content of about 5% or less and are subsequently rehydrated, the rehydrated pieces have a textural value substantially greater than the textured pieces as produced.

If desired, one or more additives such as, for example, fat or oil, flavoring, coloring, seasoning and proteinaceous materials, both animal and vegetable protein materials, may be included in the aqueous dispersion of soybean particles prior to introduction into the confined treatment zone for incorporation in the textured product to produce texturized soy pieces more closely resembling a desired meat product in color, taste and appearance.

The protein content of the aqueous dispersion of soybean particles to be texturized may, if desired, be increased to up to about 60% by weight (moisture-free basis) and still produce texturized soy pieces having a meat-like texture and appearance. That is, vegetable protein isolate, such as soy protein isolate, may be included in the aqueous dispersion to increase the protein content of the dispersion from that normally present in whole soybeans (40% to 45% by weight). Increasing the protein content of the dispersion affects the characteristics of the textured protein pieces produced, with the pieces exhibiting an increasing chewy, rubber-like character, as the protein content increases. Increasing the protein content of the dispersion up to about 60% by weight still produces textured pieces having an acceptable meat-like texture and appearance. If it is desired to increase the protein content of the aqueous dispersion, soy protein isolate preferably is included with the hydrated, acidified whole soybeans and water which are comminuted to form the aqueous dispersion.

This invention produces low cost, textured chunks or pieces of meat analogs or extenders from whole soybeans, in which the textured -product is free from objectionable odors and flavors characteristic of products derived from soybeans. The invention provides an integrated process in which whole soybeans are acidified to inactivate the lipoxidase enzyme before it can initiate any off-flavor or odor development, and are then processed under conditions which result in the direct formation of textured protein chunks or pieces having a meat-like texture and appearance, while continuing to inhibit the activity of the lipoxidase enzyme.

DESCRIPTION OF THE INVENTION

In accordance with the present invention, soybeans, either whole beans or cracked and dehulled beans, are hydrated and acidified comminuted in an aqueous medium to provide an aqueous dispersion of soybean particles having a controlled pH value, and pressurized steam is injected directly into the aqueous dispersion in a confined treatment zone to texturize the soy protein and form discrete particles or chunks of texturized soy protein which may be used, as produced, as a meat substitute product or may be dried and rehydrated for use.

Typically whole soybeans contain about 40-45% protein, 20-25% fat, 30-35% carbohydrate and 4-5% ash, on a moisture free basis and have a moisture content in the range of about 8-15%. Either the entire soybean or cracked and dehulled soybeans may be used in the process of the present invention. As used herein, the term "whole soybeans" refers to both the entire bean and to cracked and dehulled beans. The soybeans are initially cleaned by conventional procedures to remove stones, mud and other debris, such as by passing the beans through one or more magnetic separators, scalpers, destoners and the like. During cleaning, care should be exercised to avoid damaging the beans before they have been acidified, for if the bean tissue is disrupted or damaged in the presence of even a small amount of moisture, an objectionable "beany" or "grassy" flavor will be developed in the beans by the lipoxidase enzyme. The soybeans may, if desired, be cracked and dehulled by conventional procedures.

After cleaning (and dehulling, if used) the whole beans are hydrated and acidified under conditions sufficient to provide the soybeans with a pH in the range of between about 4.5 to 6.5. The beans are maintained in this range throughout the processing and texturization of the soybeans in order to inactivate lipoxidase enzyme in the beans, thereby preventing the formation of off-flavors and odors, and to permit the production of discrete chunks or pieces of textured soy protein having a meat-like firmness, texture and appearance.

Preferably the whole beans, which typically have a moisture content in the range of 8% to 12%, are hydrated and acidified by immersing the beans in water which has been acidified to a pH of between about 2 to 6 until the moisture content of the beans is increased to about 45% to 65% and the pH of the whole beans reduced to between about 4.5 to 6.5. At such a moisture level the beans are sufficiently hydrated to permit the beans to be readily comminuted and are sufficiently acidified to inactivate lipoxidase enzyme in the beans. Such an increase in the moisture content of the beans is a function of the time and temperature conditions to which the beans are subjected, and can be readily determined by routine experimentation. The hydration time and temperature conditions are of course interrelated. That is, as the temperature of the soak water is increased, the soak time required to achieve the desired moisture level and pH level in the beans decreases. For example, the moisture level of the beans may be increased to the 45% to 65% range by immersing the whole beans in cool water (e.g. 12° C. to 20° C.) for extended periods of time, i.e. about 12-18 hours. This moisture level may also be achieved by immersing the whole beans in warm water (e.g. 25° C. to 40° C.) for periods of about 3 to 6 hours, or by immersion in hot water (e.g. 55° C. to 88° C.) for one hour or less. According to one embodiment of the invention, a quantity of whole soybeans is introduced into a suitable tank and the beans soaked for 12 to 16 hours in an excess of cool, acidified water (16° C. pH of 2-4) to increase the moisture content of the beans to about 60% and reduce the pH of the whole beans to the desired level that is, between about 4.5 and 6.5 and preferably between 5.0-5.5. Procedures for hydrating and acidifying the whole beans other than immersing the beans in acidified water may of course be used, such as, for example drenching the beans with an aqueous cidic medium.

Any food grade edible acid, either organic or inorganic, may be used in acidifying the whole beans to the desired pH range. Suitable acids include, for example, acetic, lactic, hydrochloric, phosphoric, citric, tartaric and malic acids. A phosphoric acid solution is particularly suitable for reducing the pH of the whole beans to the 4.5-6.5 range without affecting the taste of the textured product produced from the acidified beans. The pH value to which the whole beans are reduced may be readily controlled by adjusting the amount of acid in the hydration water or by adjusting the time and temperature conditions to which the whole beans are subjected, and can be readily determined by routine experimentation.

Alternatively, the acidified water in which the whole beans are hydrated may be obtained by the addition of an acidogen to the soak water, that is, a compound which yields an edible acid upon ionization or hydrolysis in water. Acidogens which may be used include ionizable salts of edible acids, such as calcium chloride, calcium citrate, calcium lactate, and the like, as well as lactones, such as glucono delta lactone, gamma galactono lactone, maltobiono delta lactone, and the like. The acidogen must, of course, ionize or hydrolyze to an extent sufficient to reduce the pH of the whole beans to the desired level within the period of time the beans are immersed in the hydration water.

When the whole beans are hydrated and acidified to the desired extent, the beans are comminuted, preferably by wet milling, to provide finely divided soybean particles. Typically, the hydrated whole beans, which have a moisture content of about 45% to 65% and a pH in the 4.5 to 6.5 range, are separated from the acidified water in which they have been hydrated, and are metered into suitable comminution equipment such as a Fitz mill, other hammermills, Comitrol grinders, and the like, together with a metered amount of water or acidified hydration water in a ratio of about 1 to 15 parts by weight of beans to 1 part by weight of water, preferably 5 to 10 parts by weight of beans per 1 part by weight of water. The hydrated beans are ground to provide an aqueous dispersion of soybean particles having a solids content of between about 10% to 45% by weight and a pH in the range of 4.5 to 6.5. The dispersion may be in the form of an aqueous slurry or a homogeneous dough, depending on the solids content level of the dispersion. That is, as the solids content of the aqueous dispersion increases, the viscosity of the dispersion increases and the form of the dispersion changes from an aqueous slurry, which may be readily pumped by conventional pumping equipment, to a viscous dough, which may require the use of a piston pump or similar equipment to move the viscous dough. The solids content and concomitantly the form of the soybeans dispersion will, of course, depend on the amount of water present, both in the form of the moisture content of the hydrated beans and water used in comminuting beans. For example, when whole beans are hydrated to a moisture of about 60% and comminuted with water at weight ratios of 2:1 and 5:1 (beans:water), the resulting dispersions have solids contents of about 22% to 26% and about 28% to 31%, respectively, and are in the form of an aqueous slurry having a viscosity of about 2 million centipoise, or less. When whole beans are hydrated to a moisture of about 49% to 50% and ground with water at a ratio of 5:1 (beans:water), the resulting dispersion has a solids content of about 36% to 40% and is in the form of a viscous dough having a viscosity of about 15 million centipoise.

The temperature to the aqueous medium in which the hydrated acidified whole beans are ground may range from ambient (e.g. 20° C.) to about 99° C. (210° F.). The use of hot water, in the range of about 83° C.-95° C., is advantageous in that it further promotes inactivation of lipoxidase enzymes. However, the use of hot water is not essential. According to one embodiment of the invention, the acidified water in which the beans are hydrated and acidified, is passed through a conventional heat exchange to beat the water to the 83° C.-95° C. range, and the hot acidified water is metered into a Fitz mill or other grinding equipment using screen sizes having openings as small as 0.8 mm (0.03 inches) with a metered amount of hydrated whole beans in the wet milling operation to produce the aqueous dispersion of soybean particles.

The aqueous dispersion of soybean particles is transferred to a holding tank where water may be added, if desired to adjust the solids content of the dispersion to a desired level in the 10% to 45% range. As will be discussed in more detail herein below, the firmness, texture and appearance of the textured particles produced in the texturizing step of this invention may be varied by varying the solids content and pH of the soy particle dispersion within these ranges.

The aqueous dispersion of soybean particles thus provided is texturized to form discrete chunks or pieces of soy protein having meat-like firmness, texture and appearance by injecting pressurized steam directly into a confined stream of the aqueous dispersion of soybean particles. This direct contact of the aqueous dispersion of soybean particles with high temperature pressurized steam heats the particles and produces temperature and pressure conditions which effect rapid denaturation of the soy protein and results in the texturization of the soy protein in the form of irregularly shaped discrete pieces or chunks having a meat-like texture, appearance and firmness. The texturization of the soy protein takes place virtually instantaneously upon injection of pressurized steam into the confined stream of the soybean dispersion, and the textured chunks are rapidly discharged from the processing zone into any suitable collecting device, such as a tank, mesh basket, and the like, or onto a moving endless conveyor.

To effect the desired texturization, the slurry or dough of soybean particles is pumped through a confined treatment zone in which pressurized steam is injected directly into a confined stream of the soybean dispersion to rapidly heat the particles to a temperature in the range of between about 115° C. (240° F.) to 198° C. (388° F.) preferably between about 160° C. (320°F.) to 171° C. (340° F.). The temperature to which the dispersion is heated is directly related to the pressure of the steam injected into the confined dispersion stream. This temperature/steam pressure relationship is well known to those skilled in the at. To heat the dispersion to a temperature in the range disclosed above, i.e. 115° C. to 198° C., the corresponding steam pressure is between 10 psig to 200 psig. To heat the slurry to the preferred temperature range of 160° C. to 171° C., the pressure of the steam injected into the confined slurry or dough is between about 80 psig to 100 psig. In general, the greater the temperature and pressure conditions within the treatment zone, within in the specified ranges, the more complete texturization will occur resulting in a more resilient product. Also, particle size of the textured product increases with increasing temperature and pressure conditions in the zone.

Desirably the confined treatment zone through which the slurry or dough of soybean particles is passed, is one that is suitable for continuous processing. According to a preferred embodiment, this zone comprises a short length of pipe or tubing through which the slurry or dough of soybean particles is pumped as a confined stream. At the entrance end of treatment zone suitable valve means are provided for the introduction of the soybean dispersion into the treatment zone and the injection of steam into a confined stream of the dispersion as it passes through the treatment zone. Preferably the steam is injected into the confined slurry or dough at a point adjacent the entrance end of the treatment zone with the steam being injected through a multiperforated inlet in the treatment zone directly into the confined slurry or dough of soybean particles. At the discharge end of the confined treatment zone a backpressure maintaining means preferably is provided, such as, for example a rotary valve, a a spring loaded valve, a ball valve, or the like. In general, any device which allows the textured product pieces to exit the confined treatment zone while maintaining a predetermined backpressure upstream in the treatment zone be employed. An excess of steam may be employed, if desired. Sufficient steam must be supplied so that the slurry is heated to a temperature of at least 115° C. in order to ensure the desired texturization of the protein.

Only a very short residence time is required for the texturization of the protein within the treatment zone. Generally, for most conditions of operation, the texturization of protein occurs. virtually instantaneously, i.e. less than one second. The actual residence time of the protein within the confined treatment zone is ordinarily within the range of from 1 to 30 seconds. Although some increase in the resiliency or toughness of the texturized protein occurs with longer residence times, almost none occurs after about 30 seconds. While longer periods of residence time are not detrimental to resulting product, there is no advantage to a residence time of more than about 30 seconds.

The dimensions of the treatment zone are not critical so long as the treatment zone is of sufficient length to provide the desired retention time, and has an internal diameter sufficient to confine the aqueous slurry or dough and permit the pressurized steam to be injected directly into the confined stream. In practice, a tube having a length of about 25 to 50 cm. generally provides suitable retention times, with the tube having an internal diameter of about 1.25 to 10 cm., preferably about 2 to 3 cm..

The textured product is discharged from the exit end of the treatment zone into atmospheric conditions and may be collected in any suitable manner, such as by discharging the product into a suitable container such as a holding tank or mesh basket, or onto an endless conveyor, or the like. The product produced by the process of the present invention comprises irregularly shaped distinct pieces of textured protein material, free from any objectionable flavors and odors, including the grassy or beany flavors commonly associated with products derived from soybeans, with the chunks, as texturized or when dried and rehydrated, having a firm, meat-like texture. The textured pieces as produced have a moisture content within the range of about 50% to 80%, with the individual pieces of textured material ranging in size from about 0.25 to 0.75cm. in diameter and from about 1 to 7 to 5 cm. or more in length.

The textured soy protein pieces discharged from the treatment zone may be used directly as meat substitutes or may be dried and rehydrated prior to use. The textured soy pieces may be dried by any conventional means, such as by contacting the pieces with hot air (e.g. 121° C. to 177° C.) in a forced air dryer, moving belt dryer, fluid bed dryer, and the like, or by vacuum drying or freeze drying, to reduce the moisture content of the pieces to about 5% or less, preferably 2% or less. In dry form, the textured pieces are very stable and can be stored at room temperature for extended periods of time. The dried pieces are readily rehydrated, such as by soaking the pieces in an excess of ambient, hot or boiling water for several minutes, e.g. 3 to 15 minutes or more. On rehydration, the texturized pieces regain at least about 85%, generally between about 85% to 98% or more, of their original moisture content.

It has been found that the textural value or firmness of the texturized pieces is significantly increased upon drying and rehydration of the pieces. That is, when the texturized pieces produced by the steam texturizing step are dried to a moisture content of 5% or less and are subsequently rehydrated, the rehydrated pieces have a textural value significantly higher than the texturized pieces as produced.

The texturized pieces of soy protein produced by the present invention, as produced or when dried and rehydrated, are essentially free of off-flavors and odors associated with soy products and have a firm meatlike texture. The size, shape and appearance of the texturized pieces may vary from that of cooked ground beef to flat, elongated pieces, depending on the pH and soy solids content of the soy particle dispersion texturized. The texturized product reflects the composition of soybeans, namely, about 42 to 44% protein, 18% fat, with carbohydrates, fiber and ash, and may be used as a meat substitute in a wide variety of food products, including frozen products, canned products and dry mix products. The textured soy pieces, as produced or when dried and rehydrated, have excellent retort stability and may be retorted without thermal degradation of physical, textural or organoleptic properties.

As noted hereinabove, the firmness, texture and appearance of the textured soy particles produced in the texturizing step may be varied by adjusting the soy solids level and/or the pH of the particulate soy dispersion within the ranges set forth above. Thus, at a given pH, the textural value or firmness of the textured soy pieces, as measured by an Instron Texturometer, and the particle size of the pieces increase with increasing soy solids levels in the particulate soy dispersion which is texturized.

The pH of the particulate soy dispersion to be texturized has a significant effect on the properties and characteristics of the textured soy protein product and must be maintained within the range of between 4.5 and 6.5 in order to obtain the desired product characteristics, that is, distinct chunks or pieces of texturized soy protein material, free from off-odors and flavors and having a meat-like texture, firmness and appearance. The texturized soy particles, to be suitable for most uses as meat substitutes, should have a firmness of at least about 100 pounds as measured by an Instron Texturometer, either as produced or when dried and rehydrated. When the pH of the particulate soy dispersion is below 4.5, the textured soy protein are in the form of a plastic, gel-like mass which flows together, rather than in the form of distinct pieces or chunks, and lacks the required meat-like characteristics for use as a meat substitute. The highest textural values and the most meat-like characteristics for the texturized soy protein pieces as produced occur over a pH range of about 4.6 to 5.4, with the texturized particles produced in this pH range having a texture, firmness and appearance similar to cooked ground beef.

As the pH of the particulate soy dispersion is increased above 5.4, the textured soy pieces as produced become less firm, with the firmness of the pieces decreasing below 100 pounds (Instron Texturometer) as the pH is raised. While textured pieces produced in accordance with this invention, which have a firmness of less than 100 pounds as produced are too soft for most uses as meat substitutes, it has been found that such pieces when dried and rehydrated, exhibit a significant increase in firmness, with the textural value of the pieces well above the minimum acceptable level of 100 pounds. Accordingly, then the pH of the particulate soy dispersion is raised to the extent that the textured soy particles as produced have a textural value of less than about 100 pounds (as measured by an Instron Texturometer), the textured pieces are dried and rehydrated to provide the pieces with a textural value suitable for use as meat substitutes.

As noted hereinabove, the textured protein pieces of the present invention have a very bland flavor. If desired, the characteristics of the textured product can be modified to provide products having a variety of desired physical, tactile and/or organoleptic characteristics, depending on the intended use of the textured product. Thus, according to a preferred embodiment of the invention, one or more additives, such as fat or oil, coloring, flavoring, seasoning emulsifiers, and animal and/or vegetable protein materials may be included in the aqueous dispersion of soybean particles prior to the steam texturization step. Such additives do not significantly interfere with the texturization of the soy protein and permit the production of a textured soy protein product having a broad spectrum of desired characteristics merely by varying the additive included in the slurry. The use of such additives permits the production of different textured products tailored to specific end uses, depending on taste preferences and product requirements. Such additives may be included by any suitable means which insures that the additive is uniformly distributed throughout the particulate soybean dispersion. For example, one or more of these materials (e.g. coloring, spices emulsifiers, flavorings, etc.) may be added to the water used in comminuting the hydrated beans. Animal and/or vegetable protein materials may be introduced into the comminution equipment with the hydrated beans. Alternatively, one or more to these additives may be mixed into the particulate soybean dispersion after the dispersion has been formed, particularly when the dispersion is in the form of a slurry. Upon steam texturization, the additive is homogeneously dispersed throughout the textured protein pieces.

One such desirable additive is fat or oil. The addition to the particulate soy dispersion of up to about 25% fat or oil, and preferably about 3 to 15%, based on the weight of the aqueous dispersion, will provide the textured protein pieces with a smoother mouth feel and enhance the meat-like characteristics of the product. Any edible fat or oil may be used including unsaturated, saturated and modified fats and oils of animal or vegetable origin. Preferably a solid fat having a melting point of at least about 50° C. (122° F.), and advantageously at least about 70° C. (158° F.) is used. Excellent results have been obtained by incorporating in the particulate soy dispersion soybean oil in an amount of about 5% to 15% by weight of the dispersion.

Other desirable additives include coloring, flavoring and seasoning which may be added to the aqueous dispersion of soybean particles in amounts up to about 10% by weight of the dispersion to provide the textured protein product with a particular color, flavor, taste and/or aroma desired for a specifically intended purpose.

Animal protein materials may be incorporated in the texturized pieces if desired, to provide textured meat extender products having a higher protein content than products made using soy protein alone and which retain the taste and flavor of the animal protein material. Suitable animal protein materials which may he used include meat, poultry, fish and seafood, as well as animal protein materials having poor textural qualities, such as meat scraps, meat by-products, mechanically deboned chicken, and the like. Such animal protein materials, if used, are added, with agitation, to the particulate soy dispersion to disperse the animal protein material throughout the dispersion, and upon steam texturization, are homogeneously dispersed throughout the textured product, with the animal protein material being indistinguishable from the textured soy protein. If such an animal protein material is used, it may be included in the aqueous dispersion in amounts up to about 50% by weight of the solids content of the dispersion slurry, with a level of between 10% to 30% by weight of the dispersion being preferred.

Similarly one or more proteinaceous materials derived from vegetable sources such as for example, wheat, wheat gluten, corn, corn gluten, cottonseed, peanuts, sesame, and the like, may, if desired, also be incorporated in the texturized pieces. Such vegetable protein materials are generally used in the form of a flour or meal, but concentrates and isolates may also be employed. The vegetable protein material, if used, may be incorporated in any manner which ensures that the material will be dispersed substantially uniformly throughout the texturized pieces, such as for example, by adding the vegetable protein material, with agitation to the particulate soy dispersion, or combining the material with the hydrated whole beans prior to milling.

It will be understood that while the inclusion of one or more of these additives results in the production of textured product having specific desired characteristics, the addition of these materials is not essential to the production of the textured protein pieces of the present invention. If one or more of these additives are included in the particulate soybean dispersion, the solids content of the dispersion, including the whole soybean particles, should not be so high as to increase the viscosity of the dispersion to the extent that processing of the dispersion is impeded.

If desired, the protein content of the aqueous dispersion to be texturized may be increased from that normally resulting from the use of whole soybeans (40%–45% by weight) up to about 60% by weight on a moisture free basis. Textured protein pieces produced from an aqueous dispersion having such an increased protein content have a more chewy, rubber-like texture than pieces produced from a dispersion of only comminuted whole soybeans, but still have an acceptable meat-like texture and appearance. When an aqueous dispersion having an increased protein content is texturized, a fat or oil in the amounts indicated above, preferably is included in the aqueous dispersion to improve the meat-like characteristics of the textured pieces.

The protein content of the aqueous dispersion may be increased by including vegetable protein isolate, such as soy protein isolate, in the dispersion. According to one embodiment, soy protein isolate is included with the acidified, hydrated whole soybeans which are comminuted to form the aqueous dispersion of soybean particles. Both isoelectric soy isolate or neutral soy isolate may be used. Sufficient water should be included in the comminution step to assure hydration of the added isolate, with a ratio of between about 1 to 5 parts by weight of whole beans and isolate to 1 part by weight of water being preferred. The mixture of hydrated whole beans, soy isolate and water is comminuted by any of the wet milling procedures discussed hereinabove to provide an aqueous dispersion of finely divided soybean particles which is texturized using the same procedure as that for the aqueous dispersions without added isolate. Increasing the protein content of the aqueous dispersion above that normally present in whole soybeans (40%–45% by weight) effects a change in the texture of the texturized pieces, with the pieces exhibiting an increased chewy character as the protein content is increased.

The following specific examples are intended to illustrate more fully the nature of the present invention without acting as a limitation on its scope. As used herein, all percentages, parts, ratios and proportions are by weight and all temperatures are in ° C., unless otherwise stated or otherwise obvious herefrom to one ordinarily skilled in the art.

EXAMPLE 1

A textured soy protein product is produced in accordance with the method of the present invention as follows. A predetermined quantity of sound, whole soybeans is passed through conventional soybean cleaning equipment, such as one or more scalpers, destoners, and the like to remove stones, sticks, mud and other debris from the soybeans to be processed. Fifty pounds of cleaned whole soybeans, having a moisture content of about 8%, are soaked for a period of 12 to 16 hours in 450 pounds of cold water which has previously been acidified to a pH of about 2.5 by the addition of phosphoric acid. The acidified water is recirculated through a heat exchanger to maintain the temperature of the soak water at about 18.2° C. (65° F.). At the end of the soak period, the soaked beans have a moisture content of about 60% and a pH of between 5.0 to 5.5. The soak water is drained off and the acidified whole beans are conveyed to a Fitz mill grinder in which the whole beans are ground with water having a temperature of about 93° C. (200° F.) in a weight ratio of about 2 parts beans to 1 part water to produce a slurry of acidified soybean particles in water, with the slurry having a solids content of about 24% to 26%. This slurry is pumped to a mixing tank in which caramel coloring is added to the slurry at a level of 0.3% by weight.

The resulting slurry is then pumped into a confined treatment zone comprising a pipe having a length of 30 cm. (12 inches) and a diameter of 4 cm. (1.6 inches) into which high temperature steam is injected. The aqueous slurry is pumped directly into the treatment zone through a valve mounted on the entrance end of the pipe and steam, at a pressure of 80 psig, is injected through a multiperforated inlet directly into the confined slurry at a point immediately adjacent the entrance end of the pipe. A back pressure valve is mounted on the discharge end of the pipe and is adjusted to maintain a back pressure in the confined zone at about 80 psig. The slurry is heated to a temperature of about 162° C. (324° F.) by the direct injection of steam into the confined slurry, and is pumped through the treatment zone at a rate which provides a residence time of about 5.5 seconds. Textured soy protein pieces are discharged from the exit end of the treatment zone into a holding tank.

The product consists of chunks of dense well textured soy protein having a diameter between 0.25 to 0.75 cm. and a length of 1.2 to 5 cm., with the pieces having the texture and appearance of pieces of cooked beef. The product has a completely bland taste, free of any off-odors and flavors. The texturized pieces as produced a moisture content of about 73% and contain, on a dry weight basis, 42 to 44% protein, 18% fat, together with carbohydrates and fiber. The freshly prepared textured product is mixed with a gravy base, sealed in cans and retorted at about 120° C. (248° F.) for 45 to 60 minutes to produce a commercially sterile product. The retorted textured protein pieces retain their firmness, structural integrity and characteristic chewy texture upon retorting.

Similar results are obtained when the aqueous acidic slurry is heated in confined treatment zone to a temperature as low as 115° C. (240° F.) and as high as 177° C. (350° F.) by the direct injection of steam into the slurry of soy particles at pressures of 10 psig. and 120 psig. respectively.

EXAMPLE 2

In order to demonstrate the effect of the pH of the aqueous dispersion of soybean particles on the textural value or firmness of texturized soy protein pieces produced in accordance with the present invention, a series of tests was run in which a number of particulate soybean dispersions having varying pH levels were prepared and texturized in accordance with the procedure and using apparatus of Example 1. In each test, a measured amount of whole soybeans was immersed in a quantity of acidified soak water for a period of 17 hours to hydrate and acidify the beans and the resulting beans were ground with the acidified soak water in a weight ratio of 2 parts beans to 1 part water. In this series of tests, the water in which the beans were immersed was adjusted in each test by the addition of varying amounts of acid so that the resulting soybean dispersion had the pH value shown in Table 1.

The moisture content and the textural value or firmness of the texturized soy pieces were determined at each pH level, with the pieces being tested both as produced and when dried to a moisture of less than 5% and rehydrated by immersion in hot water for 5 minutes. The textural value of the pieces, both as poduced and when dried and rehydrated, was determined by means of an Instron Texturometer, in which a 50 gm. sample of the texturized pieces was placed in a Kramer shear cell and the shear force measured on the Instron Texturometer using a crosshead of 10 cm./minute, and recorded as pounds of force.

The results of this series of tests are set out in Table 1.

TABLE 1

| pH of Soybean Dispersion | As Produced | | Dried and Dehydrated | |
|---|---|---|---|---|
| | Moisture Content (%) | Textural Value (Instron) | Moisture Content (%) | Textural Value (Instron) |
| 4.55 | 74.2 | 159 | 72.6 | 265 |
| 4.80 | 75.2 | 162 | 73.4 | 340 |
| 4.95 | 74.7 | 158 | 75.2 | 255 |
| 5.20 | 75.6 | 163 | 76.5 | 194 |
| 5.30 | 76.3 | 155 | 76.6 | 191 |
| 5.45 | 75.5 | 129 | 77.3 | 165 |
| 5.55 | 75.7 | 97 | 71.7 | 243 |
| 5.80 | 75.1 | 45 | 68.0 | 264 |
| 6.0 | 77.6 | 24 | 68.1 | 312 |

The results shown in Table 1 clearly illustrates the dependency of the textural value or firmness of the textured soy pieces as produced on the pH of the particulate soy dispersion, with the textured pieces as produced becoming less firm and losing particle integrity as the pH increases, particularly at pH levels above about 5.4, at which the Instron measurement of the textured pieces as produced was below 100 pounds. Such pieces lack sufficient firmness to be directly usable as meat substitutes. However, as shown in Table 1, there is a significant increase in the textural value of the pieces when they are dried and rehydrated, with the textural value of pieces produced at pH levels of up to 6.0 being above 200 pounds, well above the minimum acceptable value for use as meat substitutes. The rehydrated pieces have a meat-like texture and appearance, with the pieces being substantially free of off-flavors and odors usually associated with soy products.

EXAMPLE 3

The procedure for producing texturized soy pieces and determining the textural value of the pieces, both as produced and when dried and rehydrated, over a range of pH values, as set out in Example 2, was repeated with the exception that the hydrated acidified whole beans were wet milled with acidified soak water in the weight ratio of 5 parts of beans to 1 part of water to form particulate soybean dispersions having the pH values shown in Table 2.

As shown in Table 2, the textural value of the texturized pieces as produced decreases to unacceptable levels as the pH of the soybean dispersion is increased above about 5.4. Upon drying and rehydration, the texturized pieces exhibit a substantial increase in textural value, with pieces produced at the highest pH level tested having acceptable textural values upon drying and rehydration.

TABLE 2

| pH of Soybean Dispersion | As Produced | | Dried and Dehydrated | |
|---|---|---|---|---|
| | Moisture Content (%) | Textural Value (Instron) | Moisture Content (%) | Textural Value (Instron) |
| 4.60 | 72.3 | 149 | 66.1 | 359 |
| 4.70 | 71.8 | 187 | 67.9 | 387 |
| 4.90 | 71.9 | 177 | 69.8 | 375 |
| 5.05 | 72.3 | 190 | 69.2 | 358 |
| 5.30 | 71.7 | 178 | 68.7 | 309 |
| 5.40 | 71.5 | 161 | 67.8 | 360 |
| 5.50 | 71.9 | 115 | 62.4 | 296 |
| 5.55 | 71.0 | 99 | 65.5 | 282 |
| 5.85 | 69.9 | 69 | 67.1 | 272 |
| 5.95 | 67.9 | 63 | 67.4 | 353 |
| 6.05 | 69.7 | 42 | 69.3 | 229 |

EXAMPLE 4

The procedure for producing textured soy pieces and determining the textural value of the pieces, both as produced and when dried and rehydrated, as set in Example 2, was repeated with the exception that the hydrated acidified whole beans were wet milled with acidified soak water in the weight ratio of about 8 parts of beans to one part of water to form particulate soybean dispersions having the pH values shown in Table 3.

As shown in Table 3, the textural value of the texturized pieces as produced decreases to unacceptable levels as the pH of the soybean dispersion is increased above about 5.4. However, upon drying and rehydration, the texturized pieces exhibit a substantial increase in textural value, with the pieces produced at pH levels up to 6.1 having acceptable textural values or use as a meat replacer.

TABLE 3

| pH of Soybean Dispersion | As Produced | | Dried and Dehydrated | |
|---|---|---|---|---|
| | Moisture Content (%) | Textural Value (Instron) | Moisture Content (%) | Textural Value (Instron) |
| 4.55 | 71.2 | 131 | 63.4 | 357 |
| 4.65 | 73.2 | 141 | 66.1 | 395 |
| 4.75 | 70.8 | 189 | 63.6 | 459 |
| 4.90 | 70.9 | 179 | 68.6 | 395 |
| 5.10 | 70.4 | 193 | 68.5 | 408 |
| 5.35 | 71.1 | 155 | 67.9 | 267 |
| 5.45 | 70.5 | 145 | 64.6 | 352 |
| 5.55 | 70.2 | 114 | 66.1 | 299 |
| 5.60 | 69.6 | 103 | 60.0 | 304 |
| 5.85 | 60.9 | 70 | 64.4 | 278 |
| 6.10 | 67.0 | 64 | 70.1 | 220 |

EXAMPLE 5

A series of textured products, designated A, B, C and D are produced in accordance with the procedure of Example 1 and utilizing the apparatus of Example 1, with the exception that one or more additives are incorporated in the aqueous dispersion of soybean particles prior to the introduction of the slurry into the confined treatment zone. The resulting textured products, as produced, have the characteristics set out in Table 4.

TABLE 4

| Slurry Additive | Amount (% by wt. of slurry) | Textured Product Characteristics |
|---|---|---|
| A | | |
| Soybean oil | 10.6% | Distinct chunks, smoother mouth-feel |
| B | | |
| Ground chicken meat | 8% | Distinct homogenous chunks having taste, texture and appearance of shredded chicken meat. |
| Fat (M.P. 60° C.) | 8% | |
| C | | |
| Ground beef | 25% | Distinct homogeneous chunks; resembles cooked ground beef in taste, texture and appearance; meat and soy protein not individually discernible. |
| Fat (M.P. 60° C.) | 4% | |
| D | | |
| Ground fish | 25% | Distinct homogenous chunks; resembles chunks of fish in taste, texture and appearance. |
| Fat | 7% | |

Each of the products produced in this series of tests is free of the undesirable beany of grassy flavor and odor characteristics typically associated with soybean products.

EXAMPLE 6

2.67 kg of calcium chloride was added to water (21° C.) to reduce the pH of the water from 7.5 to 5.25. Fifty seven pounds of whole soybeans were then added to the acidified water and soaked overnight (approximately 18 hours). At the end of the soak period, the hydrated beans, which had a moisture content of 55.9%, were removed from the hydration water and were introduced into a Fitz mill grinder to which the hydration water was also added at a ratio of 5:1 (beans:water). The resulting dispersion was in the form of a homogeneous dough having a pH of 5.8 and a solids content of 35%. The dispersion was steam texturized in accordance with the procedure and equipment of Example 1. The textured pieces discharged from the confined treatment zone had a moisture content of 68% and were free of any off-odors and flavors. As produced, the textured pieces had a textural value of 82 pounds (Instron Texturometer). When dried and rehydrated, the textured pieces had a textural value of 397 pounds (Instron Texturometer) and were suitable for use as a meat substitute.

EXAMPLE 7

726 grams of glucono delta lactone was added to 400 pounds of water (pH 8.5) and the water heated to about 78° C. for one hour, at which time the pH of the water had decreased to 2.9. Fifty six pounds of soybeans were soaked in the acidified water for 18 hours, at which time the soak water was drained off. The hydrated beans were ground in a Fitz mill grinder together with recirculated soak water at a ratio of 5:1 (beans:water) to form a homogeneous dough having a pH of 5.3. The dough was steam texturized in accordance with the procedure and equipment of Example 1. The texturized pieces discharged from the confined treatment zone had a textural value of 213 pounds (Instron Texturometer) and were suitable for use as meat substitutes, being free of off-flavors and odors.

EXAMPLE 8

A predetermined quantity of whole soybeans was soaked for about 18 hours in water which had been acidified to a pH of 2.0 by the addition of phosphoric acid. The soaked soybeans had a pH of 5.3, a moisture content of 60% and had a protein content of 40% (moisture-free basis). The acidified whole beans plus a predetermined quantity of neutral (pH 7.0) soy protein isolate (91.5% protein) were conveyed to a Comitrol grinder in which the soaked beans and isolate were ground with water in grinding ratio of 4,534 gms soaked whole beans, 453.4 gms soy isolate and 1,360.2 gms water per minute, with the resulting soybean dispersion having a pH of 5.6, and a protein content of 50%. The aqueous dispersion, which was in the form of a homogeneous dough, was steam texturized in accordance with the procedure and equipment of Example 1. The textured pieces discharged from the confined treatment zone were in the form of discrete chunks, free of off-flavors and odors, and were dried and rehydrated. The rehydrated pieces had a more chewy character than texturized pieces produced from whole soybeans without the addition of soy isolate.

EXAMPLE 9

The procedure of Example 8 was repeated with the exception that the soaked beans and neutral soy isolate were ground with water in a Commitrol grinder in a ratio of 3,083 gms soaked whole beans, 680 gms soy isolate and 1,360 gms water per minute, with the resulting dough having a pH of 5.7 and a protein content of 58%. The steam textured pieces were dried and rehydrated to provide discrete chunks of textured soy protein, free of off-flavors and odors, which had a more chewy character than the pieces produced in Examples 1 and 8.

While the present invention has been particularly described with regard to certain specific embodiments, the invention is intended to be limited only by the scope of the appended claims.

What is claimed is:

1. A method of processing whole soybeans to produce a textured soy protein product in the form of discrete chunks free from off-flavors and odors, which consists essentially of hydrating and acidifying whole soybeans to a pH in the range of between about 4.5 to 6.5 comminuting the hydrated and acidified whole soybeans with water and sufficient vegetable protein isolate to provide an aqueous dispersion of soybean particles containing from about 40% to 60% by weight protein on a moisture free basis, with the aqueous dispersion having a pH in the range of between about 4.5 to 6.5 and a solids content of about 10% to 45% by weight, introducing the aqueous dispersion into a confined treatment zone, injecting pressurized steam into a confined stream of the aqueous dispersion in said treatment zone under conditions sufficient to rapidly denature protein in said dispersion and texturize the protein into discrete chunks of texturized protein, and discharging the texturized protein from said treatment zone in the form of discrete, chunks which are free of off-flavors and odors.

2. The method defined in claim 1 in which the whole soybeans are hydrated and acidified by immersing the whole beans in acidified water to increase the moisture content of the whole beans to between about 45% to 65% by weight and provide the beans with a pH in the range of between 4.5 to 6.5.

3. The method defined in claim 2 in which the acidified water has a pH in the range of between about 2 to 6.

4. The method defined in claim 2 in which the acidic water contains an acid selected from the group consisting of phosphoric, hydrochloric, acetic, lactic, and mixtures thereof.

5. The method defined in claim 2 in which the whole soybeans are immersed in an aqueous medium which has been acidified by the addition of an edible acid or an acidogen.

6. The method defined in claim 1 in which the hydrated and acidified whole bean are comminuted with soy protein isolate by wet milling said beans and said isolate in acidified water.

7. The method defined in claim 5 in which the aqueous dispersion of particles is in the form of an aqueous slurry or a homogeneous dough.

8. The method defined in claim 1 in which steam having a pressure of between about 10 psig to 200 psig is injected directly into a confined stream of the aqueous dispersion of soybean particles in the confined treatment zone to heat said slurry to a temperature of at least 115° C. to thereby effect denaturing and texturization of soy protein within a period of about 1 to 30 seconds.

9. The method defined in claim 8 in which the aqueous dispersion of soybean particles is heated by steam injection to a temperature in the range of 115° C. to 198° C.

10. The method defined in claim 1 in which one or more materials selected from the group consisting of fats, oils, emulsifiers, coloring, flavoring, animal protein materials, vegetable protein materials, and combinations thereof are incorporated in the aqueous dispersion of soybean particles prior to introduction of the dispersion into the confined treatment zone.

11. The method defined in claim 1 in which the texturized protein chunks discharged from the treatment zone are dried to a moisture content of less than about 5%.

12. The method defined in claim 11 in which the dried texturized protein chunks are rehydrated under conditions such that the texturized chunks regain at least about 85% of their original moisture.

* * * * *